(12) United States Patent
Cronin

(10) Patent No.: US 6,236,401 B1
(45) Date of Patent: May 22, 2001

(54) MODEL ANIMATION USING TURBULENCE

(75) Inventor: Thomas M. Cronin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/219,131

(22) Filed: Dec. 22, 1998

(51) Int. Cl.$^7$ ....................................... G06F 15/00

(52) U.S. Cl. ............................................. 345/418

(58) Field of Search .................... 345/418, 419, 345/433, 473, 474, 475, 117, 121

(56) References Cited

U.S. PATENT DOCUMENTS 5,592,599 * 1/1997 Lindholm .............................. 345/427

* cited by examiner

Primary Examiner—Phu K. Nguyen
(74) Attorney, Agent, or Firm—Schwegman, Lundberg, Woessner & Kluth, P.A.

(57) ABSTRACT

Model animation using turbulence. A computer-implemented method first generates a noise model having a number of dimensions one greater than a number of dimensions of a source model. The source model is perturbed to introduce animated distortion into the source model, by utilizing one of a plurality of frames of the noise model, where each frame has a number of dimensions equal to the number of dimensions of the source model. The perturbed source model is then displayed on a display device. The perturbation and displaying of the source model can be repeated, utilizing different frames of the noise model.

20 Claims, 5 Drawing Sheets

MODEL ANIMATION USING TURBULENCE

FIELD OF THE INVENTION

This invention relates generally to the animation of computer models, and more particularly to the animation of computer models in low-bandwidth situations.

BACKGROUND OF THE INVENTION

In one type of computer animation, a number of frames of a computer model are generated, such that displaying the frames in succession gives the appearance that the model is animated. However, with the increasing popularity of low-bandwidth situations such as dial-up connections to the Internet, this type of animation is problematic. A dial-up connection to the Internet, for example, may only provide a throughput of 33,600 bits per second (bps). Having to receive a number of frames of a computer model over a low-bandwidth Internet connection, each of which may consume a relatively large number of data, means that the animation may take several minutes to download prior to the displaying of the animation being able to take place. Where there are a number of different animations to be downloaded for a given web page, for example, the overall effect is to negatively impact the experience of viewing the web page by a user.

For these and other reasons, there is a need for the present invention.

SUMMARY OF THE INVENTION

In one embodiment, a computer-implemented method first generates a noise model having a number of dimensions one greater than a number of dimensions of a source model. The source model is then perturbed to introduce animated distortion into the source model. This is accomplished by utilizing one of a plurality of frames of the noise model, where each frame has a number of dimensions equal to the number of dimensions of the source model. The perturbed source model is then displayed on a display device. In one embodiment, perturbation and displaying of the source model are repeated, utilizing different frames of the noise model.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
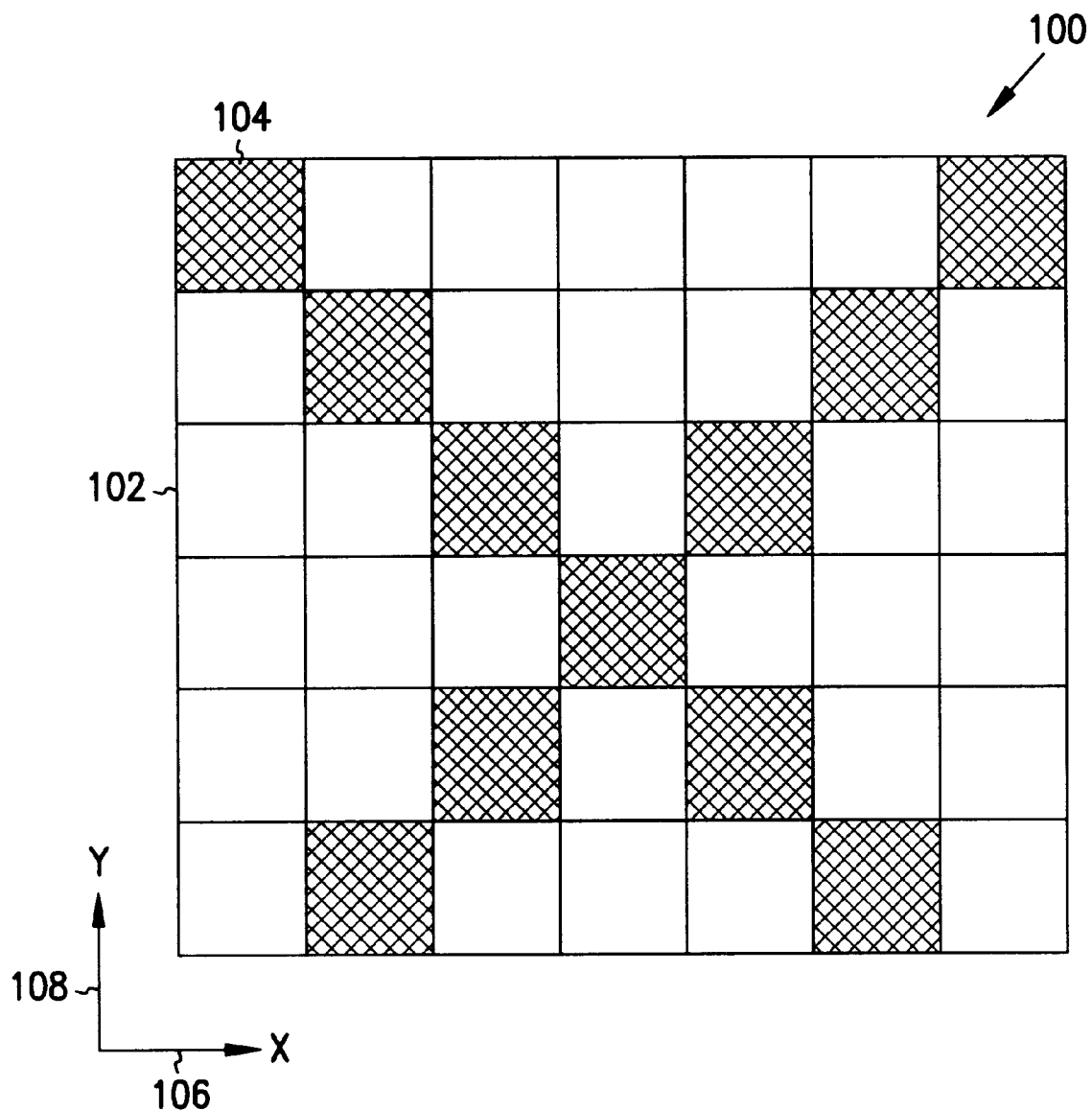
FIG. 1 shows a diagram of a source model that can be animated in accordance with embodiments of the invention.

Referring first to FIG. 1, a diagram of a source model in conjunction with which embodiments of the invention may be applied is shown. That is, the source model is that which can be animated in accordance with embodiments of the invention. The model 100 of FIG. 1 is a two-dimensional (2D) model; however, the invention is not so limited. For example, a three-dimensional (3D) model may also be utilized by embodiments of the invention. A two-dimensional model is used for purposes of describing the invention for ease of illustration and description only. Because the model 100 of FIG. 1 is two-dimensional, it can be stated that the model lies on a plane, as opposed to a three-dimensional (3D) space, for example.

The model 100 is organized on a grid 102, such that a number of pixels, or vertices, such as pixel 104, within the grid are turned on (for example, set to a binary one value, as opposed to a binary zero value). Thus, the model 100 shows an "X" pattern, as is shown in FIG. 1. Each pixel has a set of coordinates specifying the location of the pixel within the grid, as measured against the x-axis 106 and the y-axis 108. For example, the pixel 104 has the coordinates (0,5), since it lies in the $0^{th}$ grid location along the x-axis 106 and the $5^{th}$ grid location along the y-axis 108. Those of ordinary skill within the art can appreciate that the model 100 can also be colored, by use of a greater number of bits to describe each pixel such as pixel 104, and that the size of the grid 102 upon which the model 100 is transposed can also be much larger than that which is shown in FIG. 1. The invention is not so particularly limited.

Figure 2:
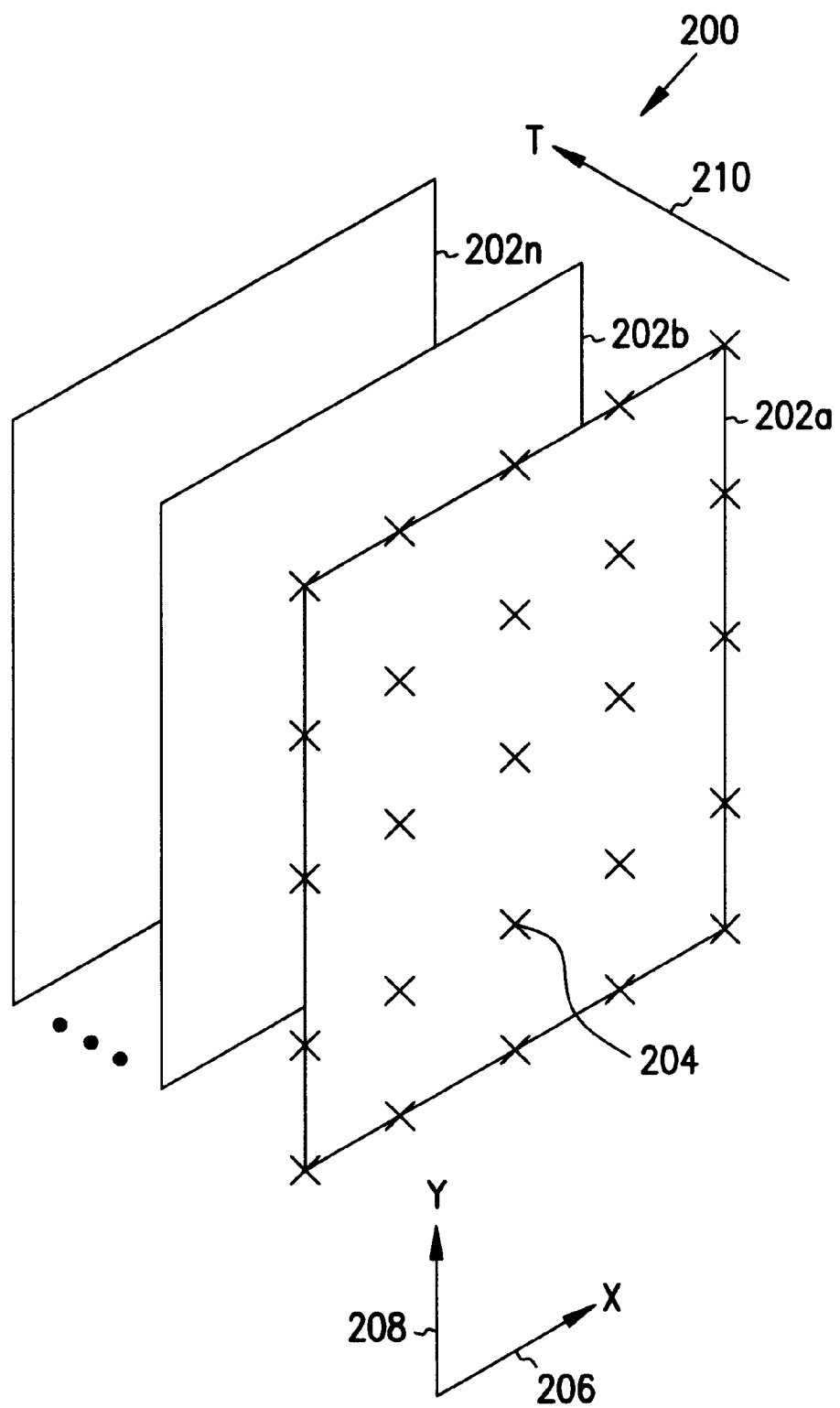
FIG. 2 shows a diagram of a noise model according to an embodiment of the invention.

The model 100 of FIG. 1 is animated in one embodiment by perturbing the model by utilizing a plurality of frames of a noise model. That is, animation is achieved by perturbing each vertex of the model in accordance with an embodiment of the invention. A representative noise model in accordance with an embodiment of the invention is shown in FIG. 2. The noise model 200 in general has a number of dimension one greater than the number of dimensions of the source model to be perturbed, such as the source model 100. Thus, the noise model 200 of FIG. 2 has three dimensions, and can be stated as being represented by a three-dimensional space.

More specifically, the noise model 200 includes a plurality of frames 202a, 202b, . . . , 202n, where each frame has a number of dimensions equal to the number of dimensions of the source model. Therefore, each frame 202a, 202b, . . . , 202n has two dimensions as shown in the embodiment of FIG. 2, such that each frame is a plane. Each frame has a number of vertices, or points, wherein the value of the noise model 200 of each vertex is a random number. For example, frame 202a has vertices such as vertex 204, such that the noise model 200 has a value at vertex 204 of the frame 202a equal to a randomly generated number. Each vertex of each frame can be specified against the x-axis 206 and the y-axis 208 (viz., the x and y coordinates of the vertex), and a particular frame can be specified against the t (time)-axis 210 (which can be considered a third or z coordinate of each vertex).

Figure 3A:
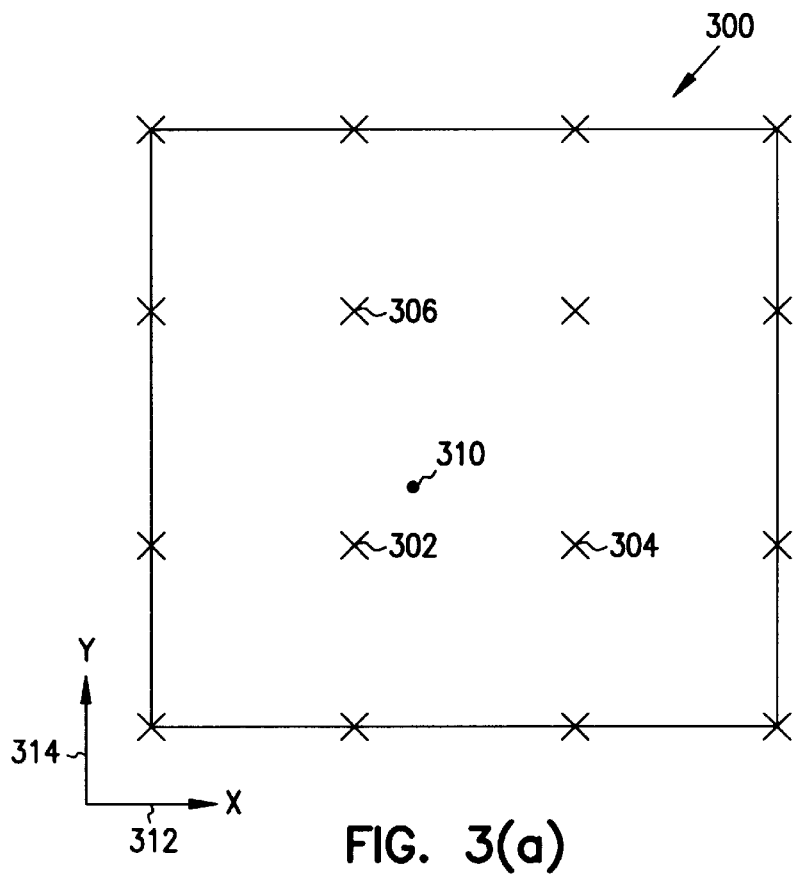
FIGS. 3(a)–3(b) show diagrams illustrating how the noise model can be used to introduce animated distortion into the source model.
Figure 3B:
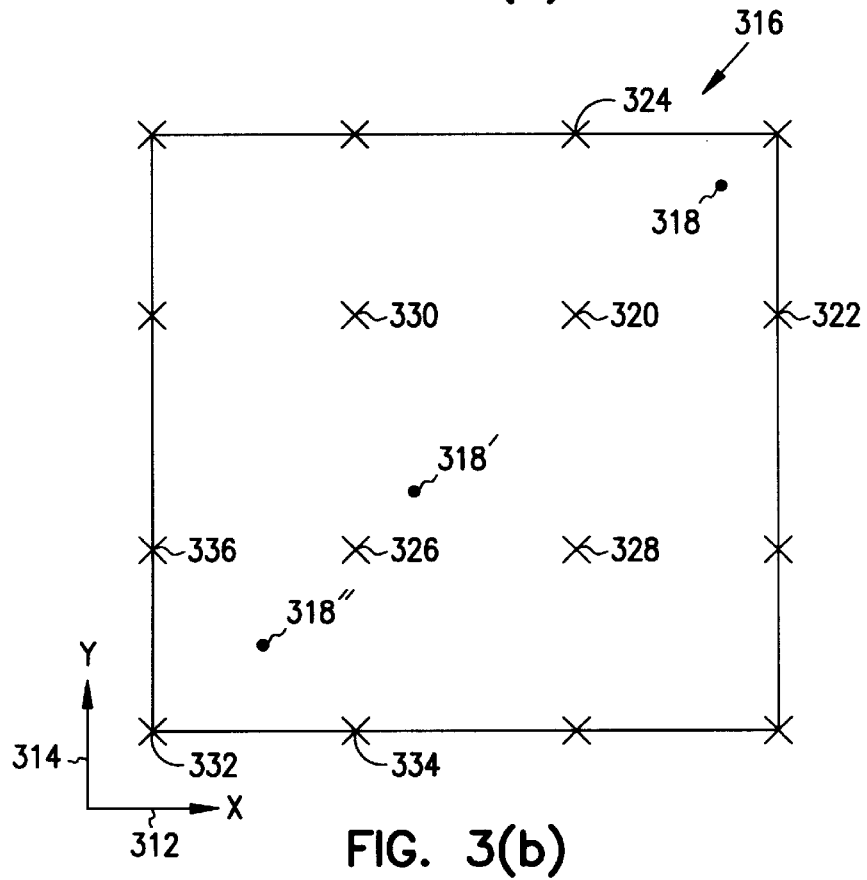

The noise model 200 of FIG. 2 can be utilized to perturb the source model 100 of FIG. 1 to generate animated distortion into the source model 100 as is shown by reference to FIGS. 3(a)–3(b). Referring first to FIG. 3(a), a particular frame 300 of the noise model is shown. The particular frame 300 includes vertices such as vertices 302, 304 and 306, where the noise model has a random number corresponding to each vertex, and each vertex can be specified as having coordinates (x, y) where x is its distance along the x-axis 312 and y is its distance along the y-axis 314. Furthermore, as shown in FIG. 3(a), a vertex 310 of the source model is mapped onto the frame 300. The vertex 310 can be stated as having coordinates (Vx, Vy), where Vx is its distance along the x-axis 312, and Vy is its distance along the y-axis 314. Thus as shown in FIG. 3, the x coordinate of vertex 302 is less than Vx, which is less than the x coordinate of vertex 304, and the y coordinate of vertex 302 is less than Vy, which is less than the y coordinate of vertex 306.

To generate animated distortion as to the vertex 310 of the source model, the random numbers at the vertices 302, 304 and 306, which are said to be the proximate vertices to the vertex 310 of the source model, are interpolated in accordance with the position of the vertex 310 relative to the positions of the proximate vertices. The resulting interpolations are said to be noise, which are then added to the original coordinates of the vertex 310 to cause animation of the vertex 310. For example, assuming that the vertex 310 is 40% the distance from vertex 302 to vertex 304 along the x-axis 312, then the noise interpolated along the x-axis 312 is 40% of the random number at vertex 302 plus 60% of the random number at vertex 304. In addition, assuming that the vertex 310 is 20% of the distance from vertex 302 to vertex 306 along the y-axis 314, then the noise interpolated along the y-axis 314 is 20% of the random number at vertex 302 plus 80% of the random number at vertex 306.

Thus, for the vertex 310 having coordinates (Vx, Vy), the vertex 310 is animated such that it has new coordinates (Vx plus the noise interpolated along the x-axis 312, Vy plus the noise interpolated along the y-axis 314). For a given time t, all of the vertices of the source model have animated distortion introduced thereinto in the same manner, utilizing the same frame t of the noise model. For the time t+1, all of the vertices of the source model having animated distortion introduced thereinto utilizing the same frame t+1 of the noise model, et seq. In this manner, the source model is animated. For a two-dimensional model, this process can be written in pseudo-code as:

```
initialize 3-dimensional noise space
for each frame:
    increment position t
    for each vertex V=(Vx, Vy) in the model:
        find a=turbulence_x (Vx, Vy, t)
        find b=turbulence_y (Vx, Vy, t)
        display vertex at (Vx+a, Vy+b)
    end for each vertex
end for each frame
```

In this pseudo-code the 3-dimensional noise space is the noise model. The turbulence functions turbulence_x and turbulence_y return the noise interpolated along the x and y axes, respectively, for the vertex (Vx, Vy, Vz) in frame t of the noise space. The term turbulence refers to the noise within the noise space as is added to the vertices of the source model, such that distorted animation of the source model results by adding the noise to the vertices of the model.

The animation of a source model by utilizing a noise model as described in conjunction with FIG. 3(a) can be modified in different ways to achieve different animation effects. For example, as shown in FIG. 3(b), harmonics can be introduced to add more complicated noise. Introducing harmonics into the interpolation of noise for a given vertex of a source model involves scaling up the frame of the noise model for each successive model, or, scaling down the vertex of the source model for each successive model. The different interpolations of noise generated according to the different harmonics are then averaged together to generate the noise to be added to the vertex of the source itself.

For example, as shown in FIG. 3(b), vertex 318 of the source model is plotted against a frame 316 of the noise model. In the first-order harmonic, the noise is interpolated as has been previously described, based on the interpolation of the random numbers at vertices 320 and 322 along the x-axis 312 for the x coordinate of the vertex 318, and based on the interpolation of the random numbers at vertices 320 and 324 along the y-axis 314 for the y coordinate of the vertex 318. In the second-order harmonic, however, the coordinates of the vertex 318 are halved (divided by two) to obtain the vertex 318'. The noise for the vertex 318' is then interpolated relative to the vertices 326, 328, and 330 as has been described. Finally, for a third-order harmonic, the coordinates of the vertex 318' are halved to obtain the vertex 318", and the noise for the vertex 318" is interpolated relative to the vertices 332, 334 and 336 as has been described. The noise for each of the harmonics is then averaged, and added to the vertex 318 to achieve animated distortion of the vertex 318.

As those of ordinary skill in the art can appreciate, the scaling down of the vertex 318 to obtain vertices 318' and 318" is identical in effect to scaling up the vertices of the frame 316 by the same amount. Thus, scaling up the vertices of the frame 316 is an alternative manner by which harmonics can be achieved. Furthermore, those of ordinary skill within the art can appreciate that lesser or greater numbers of harmonics can be utilized. For example, while three harmonics are shown in FIG. 3(b), there can be only two harmonics, or as many as desired. Introducing harmonics into the perturbance of a source model by utilizing a noise model can be written in pseudo-code as:

initialize 3-dimensional noise space
   for each frame:
      increment position t
      for each vertex V=(Vx, Vy) in the model:
         for each harmonic (h=0; max_harmonics-1; h++)
            find a(h)=turbulence_x
               (Vx/(2^h), Vy/(2^h), t)
            find b(h)=turbulence_y
               (Vx/(2^h), Vy/(2^h), t)
         find a=average of a(0) . . a(max_harmonics-1)
         find b=average of b(0) . . b(max_harmonics-1)
         display vertex at (Vx+a, Vy+b)
      end for each vertex
   end for each frame The pseudo-code listed above for introducing harmonics into the perturbance of a source model is similar to the basic pseudo-code listed initially, except that rather than single a, b, and c noise factors to be added to coordinates Vx, Vy, and Vz, respectively, of the vertex, a number of noise factors a(n), b(n) and c(n) are generated, based on the different harmonics desired, which are then average to achieve single noise factors a, b and c.

At least three other modifications to the basic animation described in conjunction with FIG. 3(a) can be achieved, in addition to or in lieu of the harmonics modification described in conjunction with FIG. 3(b). These other modifications do not, however, require reference to a corresponding figure for their understanding. The first modification is the introduction of scaling. As has been described in conjunction with FIG. 3(a), the noise a and b to be added to the x and y coordinates, respectively, of a vertex of a source model can be written in pseudo-code as:

find a=turbulence_x(Vx, Vy, t)
   find b=turbulence_y(Vx, Vy, t)

Conversely, introducing scaling into the animation of the source model means that Vx and Vy are scaled by scaling factors Nx and Ay when noise a and b are being generated; or, in pseudo-code:

find a=turbulence_x(Vx/Nx, Vy/Ay, t)
   find b=turbulence_y(Vx/Nx, Vy/Ay, t)

Ultimately, the greater the scaling factors Nx and Ay, the less change in noise a and b over time t results. Thus, scaling can be introduced to provide for less (i.e., more minute) animation (or, more, less minute, animation in the case where Nx and Ay are less than one). Furthermore, the speed at which animation occurs can be changed by scaling the frame position t by a scaling factor St. A large scaling factor St means that proceeding from a given frame t within the noise model to a next frame t+1 will not occur as rapidly, for example.

A second modification is the introduction of weighting. Introducing weighting into the animation of the source model means that the noise a and b to be added to the x and y coordinates, respectively, of a vertex of a source model are weighted by weighting factors Wa and Wb before they are added to the x and y coordinates of the vertex. This can be written in pseudo code as:

a=Wa*a
   b=Wb*b
   add a to Vx
   add b to Vy

Ultimately, the greater the weighting factors Wa and Wb, the greater the turbulence introduced into the source model. This is because the greater the weighting factors, the greater the noise a and b that is added to the coordinates of the vertices of the source model.

A third modification that can be made to the basic animation described in conjunction with FIG. 3(a) is the introduction of time animation of the noise through the source model. In particular, where a rectangular slice of the noise space is taken for each frame of animation, each slice is being taken behind the previous slice, such that in using the time animation feature, the next rectangular slice is being taken not right behind the previous one, but shifted to the left or the right (and/or up or down) from the previous slice, as well as behind. This can be accomplished by adding t to the coordinates of a vertex when generating the noise to add to the coordinates; or, as written in pseudo-code:

find a=turbulence_x(Vx+t, Vy+t, t)
   find b=turbulence_y(Vx+t, Vy+t, t)

The result of the introduction of time animation of the noise is that over time, the noise appears to move through the source model being animated.

Those of ordinary skill within the art can appreciate that in introducing turbulence into a source model by utilizing a noise model, none or any combination of the modifications that have been described can be used to generate a desired effect. Different effects that can be achieved, for example, but to which the invention is not necessarily limited, include viewing a source object as if it were underwater, viewing a source object as if through a heat-induced gaseous turbulence, and viewing the object as if the object were made of gelatin. The basic manner by which animation of a source model can be achieved in accordance with embodiments of the invention by utilizing a noise model has thus been described. What is now described is a method according to an embodiment of the invention, a system according to an embodiment of the invention, and a computer in conjunction with which embodiments may be practiced.

Figure 4:
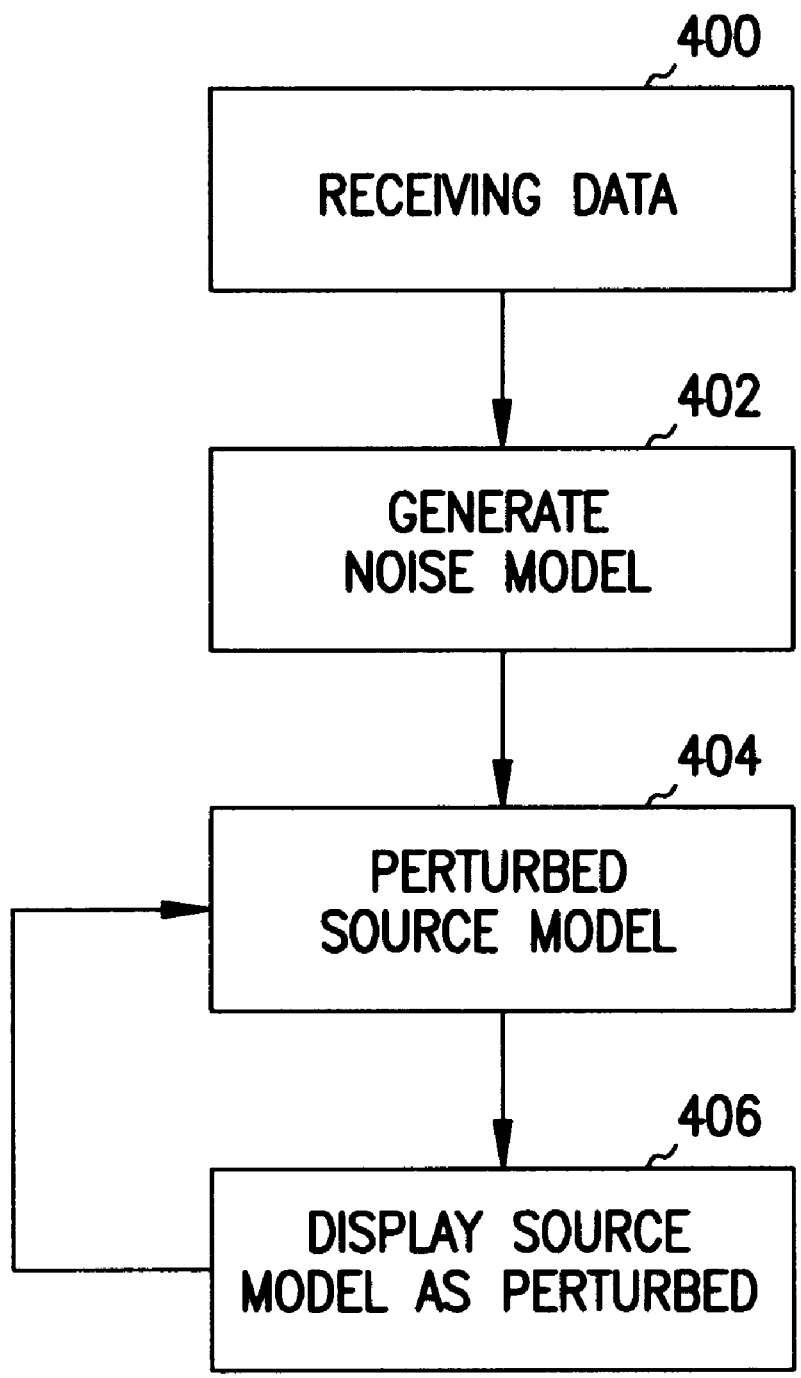
FIG. 4 shows a computer-implemented method according to an embodiment of the invention.

Referring first to FIG. 4, a computer-implemented method according to an embodiment of the invention is shown. The computer-implemented method is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer.

In block 400, data is received representing a source model, and data is also received representing a plurality of parameters governing generation of the noise model and perturbation of the source model. For example, the parameters may include parameters governing the number of harmonics, the weighting of the source model, the scaling of the source model, and the time-animation of the noise through the source model, as have already been described. The plurality of parameters is not so limited, however, by the invention. It is noted that only in block 400 is data received representing a source model, and data is received such that only one "version" of the source model is received. In situations where data representing the source model is a great amount, this provides embodiments of the invention with advantages over the prior art. For example, rather than having data representing a number of versions of the source model, where each version is a frame of animation of the source model, as in the prior art and which can result in a very large amount of data that needs to be transmitted, embodiments of the invention as in FIG. 4 only transmit data representing one version of the source model. In low-bandwidth situations, this means that animation of the source model can be achieved with much less transmission of data, lessening the amount of time necessary to receive data regarding the animation of a source model prior to it being animated by the receiving system or computer.

In block 402, a noise model is generated in accordance with the parameters received in block 400. As has been described, the noise model has a number of dimensions one greater than the number of dimensions of the source model. Note that data representing the noise model itself is not received in block 400, only data representing parameters regarding the noise model—such as the number of harmonics, etc. This also results in a savings in the amount of data that must be received, providing embodiments of the invention with advantages over the prior art in low-bandwidth situations.

In block 404, the source model is perturbed by utilizing one of a plurality of frames of the noise model. As has been described, each frame of the noise model has a number of dimensions equal to the number of dimensions of the source model. The source model is perturbed to introduce animated distortion into the source model—that is, to animate the source model. Thus, in block 406, the source model as perturbed is displayed on a display device, such as a cathode-ray tube (CRT) monitor or a flat panel display (FPD), as known in the art, although the invention is not so limited. The blocks 404 and 406, of perturbing the source model and displaying the source model as perturbed, are repeated as many times as necessary, utilizing successive or different frames of the plurality of frames of the noise models, to continue the animation of the source model.

Figure 5:
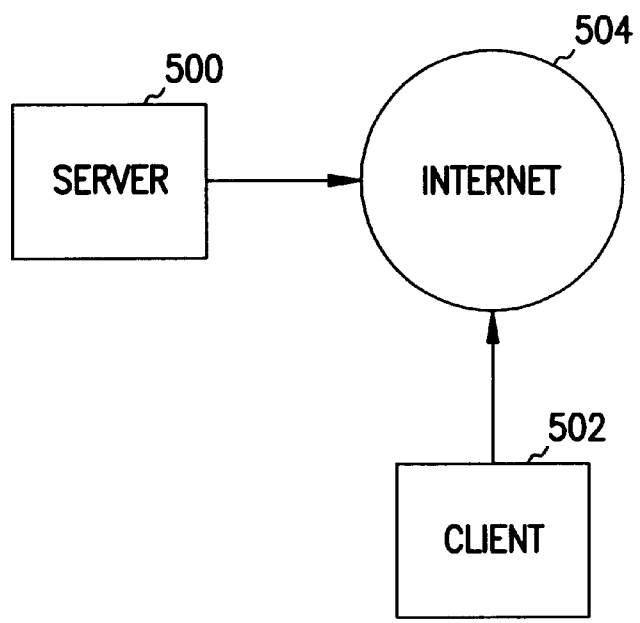
FIG. 5 shows a diagram of a computerized system in accordance with an embodiment of the invention; and, FIG. 6 shows a diagram of a computer in conjunction with which embodiments of the invention may be practiced.

Referring next to FIG. 5, a diagram of a system in accordance with an embodiment of the invention is shown. The system includes a server 500 communicatively coupled to a client 502 via the Internet 504. This particular system is shown to emphasize that an embodiment of the invention such as the embodiment of FIG. 5 can be advantageously utilized in conjunction with animations of source models received over the Internet 504 by a client 502 from a server 500, where in many cases the client 502 has a low-bandwidth dial-up connection to the Internet 504, such as a 33,600 bits-per-second (bps) throughput modem, as known in the art. The invention is not so particularly limited, however, as those of ordinary skill in the art can appreciate.

The server 500 thus sends data representing a source model and data representing parameters governing generation of a noise model and perturbation of the source model based on the noise model, to the client 502 over the Internet 504. The client 502 receives this data, and in response generates a noise model based on the parameters, as has been described, perturbs the source model by utilizing the noise model and based on the parameters, as has also been described, and displays the source model as perturbed, for example, on a display device of the client 502. Thus, in the situation where the client 502 has a low-bandwidth dial-up connection to the Internet 504, the system of FIG. 5 is such that the client 502 only has to receive data regarding one version of a source model, not multiple versions as in the prior art, and does not have to receive data regarding a noise model, only data regarding parameters for the generation of the noise model (and the perturbation of the source model to achieve animation thereof). This results in the lessening of time in receiving data regarding a source model to be animated prior to actually animating the source model.

Figure 6:
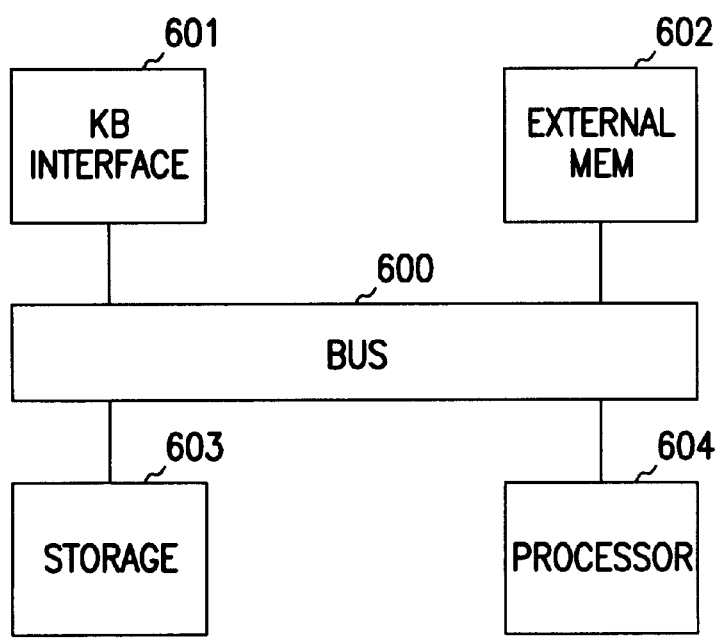

Referring finally to FIG. 6, a diagram of a computer in conjunction with which embodiments of the invention may be practiced is shown. For example, the computer of FIG. 6 can act as the client, or the server, as has been described in conjunction with FIG. 5. The computer comprises bus 600, keyboard interface 601, external memory 602, mass storage device 603 and processor 604. Bus 600 can be a single bus or a combination of multiple buses. Bus 600 can also comprise combinations of any buses. Bus 600 provides communication links between components in the computer. Keyboard controller 601 can be a dedicated device or can reside in another device such as a bus controller or other controller. Keyboard controller 601 allows coupling of a keyboard to the computer system and transmits signals from a keyboard to the computer system. External memory 602 can comprise a dynamic random access memory (DRAM) device, a static random access memory (SRAM) device, or other memory devices. External memory 602 stores information from mass storage device 603 and processor 604 for use by processor 604. Mass storage device 603 can be a hard disk drive, a floppy disk drive, a CD-ROM device, or a flash memory device. Mass storage device 604 provides information to external memory 602. Processor 604 can be a microprocessor and is capable of decoding and executing a computer program such as an application program or operating system with instructions from multiple instruction sets.

Model animation using turbulence has been described. Although specific embodiments have been illustrated and described herein, it will be appreciated by those of ordinary skill in the art that any arrangement which is calculated to achieve the same purpose may be substituted for the specific embodiments shown. For example, one embodiment of the invention has been described relative to a two-dimensional (2D) source model; the invention itself is not so limited, however. This application is intended to cover any adaptations or variations of the present invention. For example, other embodiments of the invention can be relative to a third-dimensional (3D) source model, etc.; the invention is not so limited. Therefore, it is manifestly intended that this invention be limited only by the following claims and equivalents thereof.

We claim:

1. A computer-implemented method comprising:
   generating a noise model having a number of dimensions one greater than a number of dimensions of a source model;
   perturbing the source model by utilizing one of a plurality of frames of the noise model, each frame having a number of dimensions equal to the number of dimensions of the source model, to introduce animated distortion into the source model; and,
   displaying the source model as perturbed on a display device.

2. The computer-implemented method of claim 1, further comprising repeating perturbing and displaying the source model utilizing different frames of the plurality of frames of the noise model.

3. The computer-implemented method of claim 1, wherein the source model has three dimensions (3D).

4. The computer-implemented method of claim 1, wherein generating a noise model comprises for each frame of the plurality of frames of the noise model, generating a random number at each of a plurality of predetermined points within the frame.

5. The computer-implemented method of claim 4, wherein perturbing the source model comprises for each of a plurality of points of the source model adding noise to the point based on an interpolation of the random numbers at proximate predetermined points within the frame of the noise model.

6. The computer-implemented method of claim 5, wherein perturbing the source model further comprises adding noise to each of the plurality of points of the source model a number of times equal to a harmonics parameter.

7. The computer-implemented method of claim 6, wherein each of a plurality of harmonics corresponds to a different scaling of the noise model.

8. The computer-implemented method of claim 5, wherein for each of a plurality of points of the source model adding noise to the point comprises adding noise to the point based on a weighted interpolation of the random numbers at proximate predetermined points within the frame of the noise model, wherein the interpolation is weighted based on a weighting parameter.

9. The computer-implemented method of claim 5, wherein for each of a plurality of points of the source model adding noise to the point comprises adding noise to the point based on an interpolation of the random numbers at proximate and scaled predetermined points within the frame of the noise model, wherein predetermined points are scaled based on a scaling parameter.

10. The computer-implemented method of claim 5, wherein for each of a plurality of points of the source model adding noise to the point comprises adding noise to the point based on an interpolation of the random numbers at proximate and time-animated predetermined points within the frame of the noise model, wherein the predetermined points are time-animated based on a time-animation parameter.

11. The computer-implemented method of claim 1, further initially comprises:
receiving data representing the source model; and,
receiving data representing a plurality of parameters governing generation of the noise model and perturbation of the source model.

12. The computer-implemented method of claim 1, wherein generating a noise model comprises generating a noise model designed to introduce a predetermined perturbation effect into the source model selected from the group essentially consisting of: underwater object viewing, viewing through heat-induced gaseous turbulence, and viewing the object as if the object were made of gelatin.

13. A computerized system comprising:
a server to send data representing a source model and data representing parameters governing generation of a noise model and perturbation of the source model based on the noise model; and,
a client to receive the data representing the source model and the data representing the parameters, to generate a noise model based on the parameters, to perturb the source model by utilizing the noise model and based on the parameters, and to display the source model as perturbed.

14. The computerized system of claim 13, wherein the server and the client are communicatively coupled to one another over the Internet.

15. The computerized system of claim 13, wherein the client is to generate the noise model by, for each frame of a plurality of frames of the noise model, generating a random number at each of a plurality of predetermined points within the frame.

16. The computerized system of claim 15, wherein the client is to perturb the source model by, for each of a plurality of points of the source model, adding noise to the point based on an interpolation of the random numbers at proximate predetermined points within the frame of the noise model.

17. The computerized system of claim 13, wherein the parameters comprise: a harmonics parameter, a weighting parameter, a scaling parameter, and a time-animation parameter.

18. A machine-readable medium having instructions stored thereon for execution by a processor to perform a method comprising:
generating a noise model having a number of dimensions one greater than a number of dimensions of a source model;
perturbing the source model by utilizing one of a plurality of frames of the noise model, each frame having a number of dimensions equal to the number of dimensions of the source model, to introduce animated distortion into the source model;
displaying the source model as perturbed on a display device; and,
repeating perturbing and displaying the source model utilizing different frames of the plurality of frames of the noise model.

19. The machine-readable medium of claim 18, wherein generating a noise model comprises for each frame of the plurality of frames of the noise model, generating a random number at each of a plurality of predetermined points within the frame.

20. The machine-readable medium of claim 19, wherein perturbing the source model comprises for each of a plurality of points of the source model adding noise to the point based on an interpolation of the random numbers at proximate predetermined points within the frame of the noise model.

* * * * *

UNITED STATES PATENT AND TRADEMARK OFFICE
CERTIFICATE OF CORRECTION

PATENT NO. : 6,236,401 B1  Page 1 of 1
DATED : May 22, 2001
INVENTOR(S) : Thomas M. Cronin It is certified that error appears in the above-identified patent and that said Letters Patent is hereby corrected as shown below:

Column 3,
Line 9, "dimension" should read -- dimensions --.

Signed and Sealed this

Twenty-ninth Day of January, 2002

Attest:

Attesting Officer

JAMES E. ROGAN
Director of the United States Patent and Trademark Office